Dec. 8, 1931.  J. L. DRAKE  1,834,942
APPARATUS FOR FORMING SHEET GLASS
Filed Sept. 27, 1928
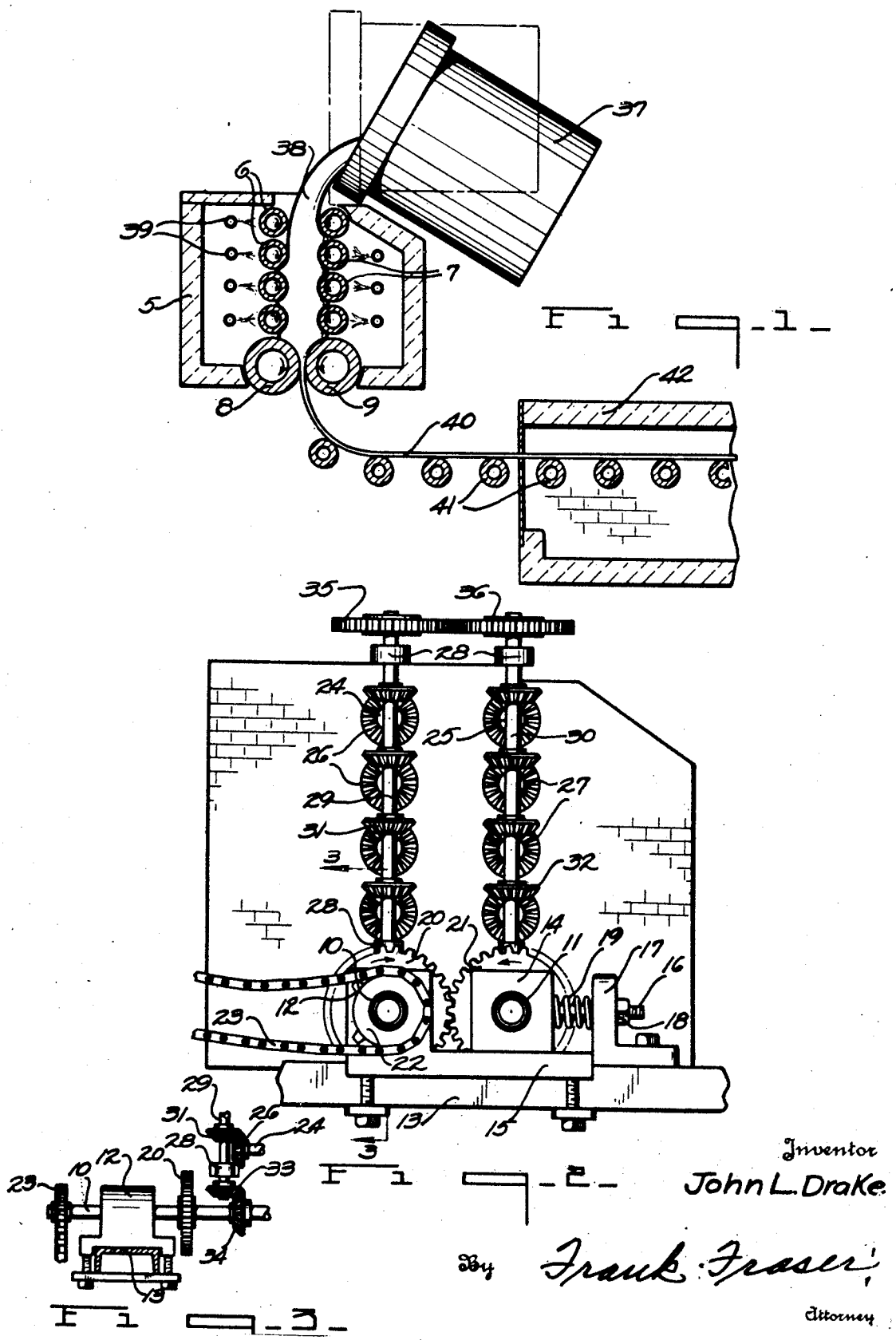
Inventor
John L. Drake.
By Frank Fraser
Attorney Patented Dec. 8, 1931

1,834,942

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

APPARATUS FOR FORMING SHEET GLASS

Application filed September 27, 1928. Serial No. 308,763.

This invention relates to a method and apparatus for forming sheet glass, the glass sheets being particularly well adapted for use as plate glass blanks which are to be subsequently ground and polished although they are of course not necessarily restricted to such use.

The general object of the present invention is the provision of an improved method of and apparatus for conditioning the glass prior to its being formed into a sheet and more particularly, the invention contemplates the provision of means for treating both surfaces of the body of glass going to make up the sheet in the same manner in order that undue chilling of one portion of the glass and allowing it to set prior to another portion is avoided, to the end that the glass body may be of a more uniform temperature. Uneven chilling of the glass body prior to its being formed into a sheet is undesirable since the cold particles of glass mixing with the hotter particles tend to create defects in the finished product.

A more specific object of the invention is the provision of means for accomplishing the above objects embodying a conditioning chamber wherein is arranged a plurality of pairs of spaced superposed rotatable members adapted to receive therebetween the body of glass and to treat both surfaces thereof in the same manner, means being provided for heating said members to avoid chilling of the glass, and means being also provided at the lower end of the conditioning chamber for receiving the body of glass and reducing it to sheet form.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through forming apparatus provided by the present invention.

Fig. 2 is a side elevation thereof showing the driving means for the conditioning and forming rolls, and Fig. 3 is a detail section taken substantially on line 3—3 of Fig. 2.

Referring to the drawings, 5 designates a substantially rectangular conditioning chamber provided with an opening in the top and bottom thereof, which openings are preferably in substantially vertical alignment. Mounted within the conditioning chamber 5 are a plurality of pairs of spaced superposed rotatable conditioning members or rolls 6 and 7, while positioned beneath the lowermost pair of conditioning rolls are the spaced horizontal sheet forming rolls 8 and 9 arranged relative to one another to create a sheet forming pass therebetween, the width of which determines the thickness of sheet produced.

The forming rolls 8 and 9 are mounted upon shafts 10 and 11 respectively which project through the opposite side walls of the conditioning chamber 5. Each end of shaft 10 of roll 8 is mounted in a fixed bearing 12 carried by a horizontal supporting beam 13. Each end of shaft 11 of roll 9 is mounted in a bearing 14 slidably mounted upon the guideway 15 which may be a part of or separate from the bearing 12. The bearing 14 is adjustable toward and away from the bearing 12 so as to vary the distance between the sheet forming rolls or the width of the sheet forming pass. To effect horizontal adjustment of the bearing 14, the same may be provided with an adjusting bolt 16 extending through the upstanding portion of a bracket 17 carried by beam 13 and having threaded upon its outer end a nut 18. Upon rotation of the nut 18, the bearing 14 may be moved inwardly or outwardly as desired. The bearing 14 is normally urged inwardly by means of a compression spring 19. Carried at either end of the roll shafts 10 and 11 are gears 20 and 21 respectively in constant mesh with one another. One of the roll shafts and as herein illustrated, the roll shaft 10, is adapted to be positively driven to effect rotation of the forming rolls and for this purpose a sprocket is carried by shaft 10 and driven by a sprocket chain 23 from a suitable source of power, not shown.

The conditioning rolls 6 and 7 are mounted upon shafts 24 and 25 respectively, which shafts likewise project through the side walls of the conditioning chamber 5. Each of the shafts 24 of rolls 6 carries a bevel gear 26 while carried by each of the shafts 25 of rolls 7 is a similar bevel gear 27. Mounted in suitable brackets 28 carried by the walls of the conditioning chamber are the spaced vertical shafts 29 and 30 carrying bevelled gears 31 and 32 which mesh with the bevelled gears 26 and 27 respectively. The shaft 29 is preferably driven from the roll shaft 10 and to this end carries a bevel gear 33 adjacent the lower end thereof meshing with a bevel gear 34 carried by the roll shaft 10. The shaft 30 is driven from the shaft 29 through the intermeshing gears 35 and 36 at the upper ends thereof. Thus, the sheet forming rolls and conditioning rolls are driven by a common drive from the same source of power.

The apparatus above described is preferably utilized in the forming of sheets from pot glass or, in other words, glass which has been melted and refined within a pot while maintained in a substantially quiescent state. The use of pot glass is desirable because it is ordinarily of the best quality. Therefore, in operating the construction herein illustrated, a pot 37 containing a mass of completely refined and settled glass is placed above the conditioning chamber 5 and the pot tilted so as to empty the glass 38 between the conditioning rolls 6. As the body of glass is poured between the conditioning rolls, the said rolls are driven in the direction indicated by the arrows in Fig. 1 to treat opposite surfaces of the glass body in the same manner. Arranged within the conditioning chamber in back of the rolls 6 and 7 are gas burners or other suitable heating means 39, said heating means being adapted to heat the outer surfaces of the rolls in order to prevent chilling of the glass upon contact of the glass therewith. The conditioning rolls are preferably provided with a central bore in order that a suitable temperature control medium may be passed therethrough to prevent overheating thereof. While the internal cooling means prevents overheating of the rolls yet the burners 39 will maintain the outer surfaces of the rolls at the desired temperature so that they will not have any injurious effect upon the glass. As the body of glass passes downwardly through the conditioning chamber toward the bottom thereof, it encounters the sheet forming rolls 8 and 9 which serve to reduce the glass to sheet form. The sheet 40 issuing from between the forming rolls is preferably deflected into the horizontal plane and carried along upon a plurality of rollers 41 into and through an annealing leer 42. By treating the opposite surfaces of the glass body in the manner above described, the glass will be maintained at a more uniform temperature and uneven chilling and setting of different portions of the glass is minimized if not entirely avoided. Also, it will be noted that the upper portions of the peripheries of the sheet forming rolls project upwardly into the conditioning chamber so that the glass encounters the said rolls and is reduced to sheet form while in the conditioning chamber. Were the forming rolls positioned exteriorly of the chamber, the glass would have a tendency to become chilled during its passage from the conditioning chamber to said rolls.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim

1. In apparatus for forming sheet glass, movable means for receiving a downwardly flowing body of molten glass and for treating opposite surfaces thereof in the same manner, and means for subsequently reducing the body of glass to sheet form.

2. In apparatus for forming sheet glass, a conditioning chamber, movable means within said chamber for receiving a downwardly flowing body of molten glass and wherein opposite surfaces of the glass body are treated thereby in the same manner to prevent uneven chilling thereof, and means for subsequently reducing the body of glass to sheet form.

3. In apparatus for forming sheet glass, a plurality of pairs of spaced superposed movable members for receiving therebetween an unformed body of glass and for treating opposite surfaces thereof in the same manner while maintaining it as an unformed body, and means for subsequently reducing the body of glass to sheet form.

4. In apparatus for forming sheet glass, a plurality of pairs of spaced superposed rotatable members for receiving therebetween a body of glass and for treating opposite surfaces thereof in the same manner, means for heating the exterior surfaces of the rolls opposite the point of contact thereof with the glass to prevent chilling of said glass, and means for subsequently rolling the body of glass to sheet form.

5. In apparatus for forming sheet glass, a conditioning chamber, a plurality of pairs of spaced superposed rotatable conditioning rolls arranged within said chamber and adapted to receive therebetween a downwardly moving unformed body of molten glass and to treat opposite surfaces thereof in the same manner without effecting any reduction in the thickness thereof, and means for subsequently reducing the body of glass to sheet form.

6. In apparatus for forming sheet glass, a conditioning chamber, a plurality of pairs of spaced superposed conditioning rolls arranged within said chamber and adapted to receive therebetween a downwardly moving body of molten glass and to treat opposite surfaces thereof in the same manner, means arranged within the conditioning chamber in back of the rolls for heating the outer surfaces thereof to prevent chilling of the glass, and means for rolling the body of glass to sheet form.

7. In apparatus for forming sheet glass, a conditioning chamber, a plurality of pairs of spaced superposed conditioning rolls mounted within said chamber and adapted to receive therebetween a downwardly moving unformed body of molten glass and to treat opposite surfaces thereof in the same manner while maintaining it as an unformed body, and a pair of forming rolls arranged beneath and adjacent the lowermost pair of conditioning rolls and having the upper portions of their peripheries disposed within the conditioning chamber.

8. In apparatus for forming sheet glass, a conditioning chamber, a plurality of pairs of spaced superposed conditioning rolls mounted within said chamber and adapted to receive therebetween a downwardly moving body of molten glass, a pair of forming rolls arranged beneath and adjacent the lowermost pair of conditioning rolls and having the upper portions of their peripheries disposed within the conditioning chamber, and means arranged within the heating chamber in back of said conditioning rolls for heating the same to prevent chilling of the glass.

9. In apparatus for forming sheet glass, a conditioning chamber, a plurality of pairs of spaced conditioning rolls mounted within said chamber and adapted to receive therebetween an unformed body of molten glass and to treat opposite surfaces thereof in the same manner without effecting any reduction in the thickness thereof, a pair of forming rolls for receiving the body of glass from the conditioning rolls and reducing it to sheet form, and a common drive means for said conditioning rolls and forming rolls.

10. In apparatus for forming sheet glass, a conditioning chamber, two series of spaced superposed conditioning rolls arranged within the chamber, shafts upon which said rolls are mounted and which shafts project through opposite side walls of said chamber, a bevelled gear carried at the end of each shaft, a vertical shaft for each series of superposed rolls, bevelled gears on said vertical shafts meshing with corresponding gears on said roll shafts, a pair of forming rolls positioned beneath and adjacent the lowermost conditioning rolls, means for driving said forming rolls, operative drive connections between one of said forming rolls and one vertical shaft, and means for driving the second vertical shaft from said first vertical shaft.

11. In apparatus for forming sheet glass, a conditioning chamber, two series of spaced superposed conditioning rolls arranged within the chamber, shafts upon which said rolls are mounted and which shafts project through opposite sidewalls of said chamber, a bevelled gear carried at the end of each shaft, a vertical shaft for each series of superposed rolls, bevelled gears on said vertical shafts meshing with corresponding gears on said roll shafts, a pair of forming rolls positioned beneath and adjacent the lowermost conditioning rolls, means for positively driving one of said forming rolls, intermeshing gears for driving the second forming roll from the first forming roll, operative drive connections between the positively driven forming roll and one vertical shaft, and operative drive connections between the first vertical shaft and the second vertical shaft.

Signed at Toledo, in the county of Lucas and State of Ohio, this 25th day of September 1928.

JOHN L. DRAKE.